US007853202B1

(12) United States Patent
Visotsky et al.

(10) Patent No.: US 7,853,202 B1
(45) Date of Patent: *Dec. 14, 2010

(54) METHOD AND APPARATUS FOR DETERMINING AN APPROPRIATE LINK PATH IN A MULTI-HOP COMMUNICATION SYSTEM

(75) Inventors: Eugene Visotsky, Buffalo Grove, IL (US); Kevin L. Baum, Rolling Meadows, IL (US); Mark C. Cudak, Rolling Meadows, IL (US); Philippe J. Sartori, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/848,250

(22) Filed: Aug. 2, 2010

Related U.S. Application Data

(62) Division of application No. 11/874,605, filed on Oct. 18, 2007.

(60) Provisional application No. 60/864,550, filed on Nov. 6, 2006.

(51) Int. Cl.
*H04W 88/02* (2009.01)

(52) U.S. Cl. .................................................. 455/9

(58) Field of Classification Search ................ 370/274, 370/310.2, 315, 328, 329, 341; 455/226.2, 455/525, 450, 451, 452.1, 452.2, 464, 516
See application file for complete search history.

(56) References Cited

U.S. PATENT DOCUMENTS

| 2005/0232183 A1* | 10/2005 | Sartori et al. ............... 370/319 |
| 2005/0245270 A1 | 11/2005 | Sartori et al. |
| 2008/0043815 A1* | 2/2008 | Hart et al. .................... 375/135 |
| 2009/0003267 A1* | 1/2009 | Ramachandran et al. .... 370/328 |
| 2009/0225706 A1* | 9/2009 | Ramachandran et al. .... 370/329 |
| 2010/0002619 A1* | 1/2010 | Hart et al. .................... 370/315 |

\* cited by examiner

*Primary Examiner*—Diane Mizrahi

(57) ABSTRACT

A determination of link quality ($C_{SR}$) is made from the subscriber station to a relay station. A determination of link quality ($C_{RB}$) is made from the relay station to the base station, and a determination of link quality ($C_{SB}$) is made from the subscriber station to the base station. A quality of a first link path from the subscriber station to the base station that passes through the relay station is determined based on at least the link qualities (Csr, Crb). A quality of a second link path from the subscriber station to the base station that does not pass through the relay station is determined based on at least the link quality (Csb). Finally, a determination is made whether to utilize the first link path or the second link path from the subscriber station to the base station based on at least the quality of the first and second link paths.

4 Claims, 5 Drawing Sheets

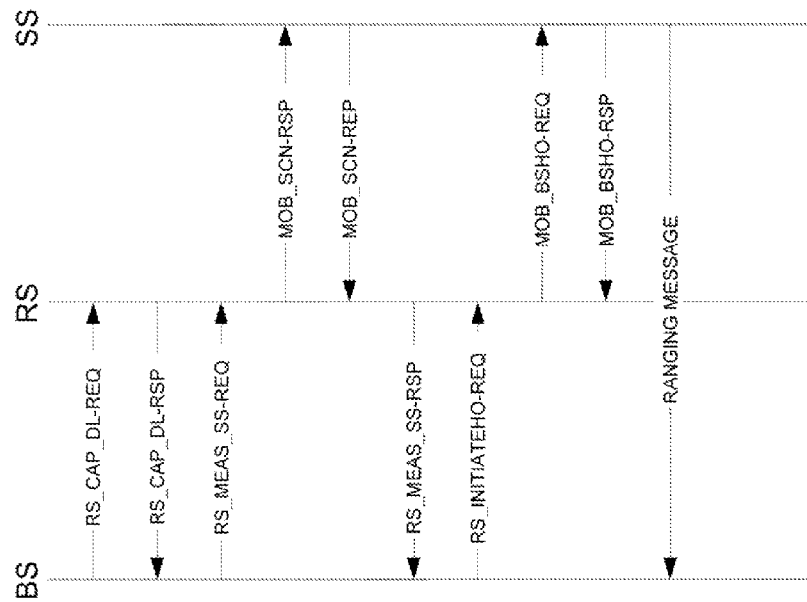
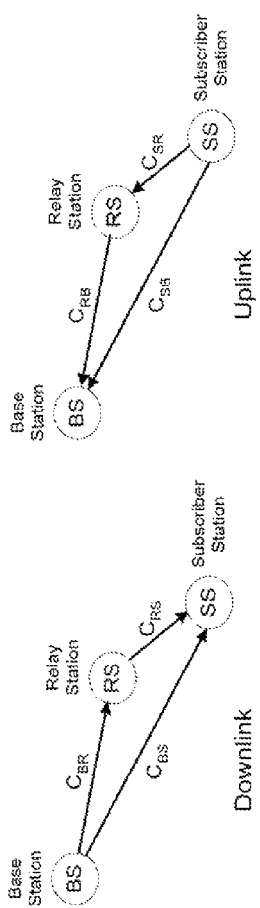
FIG. 1
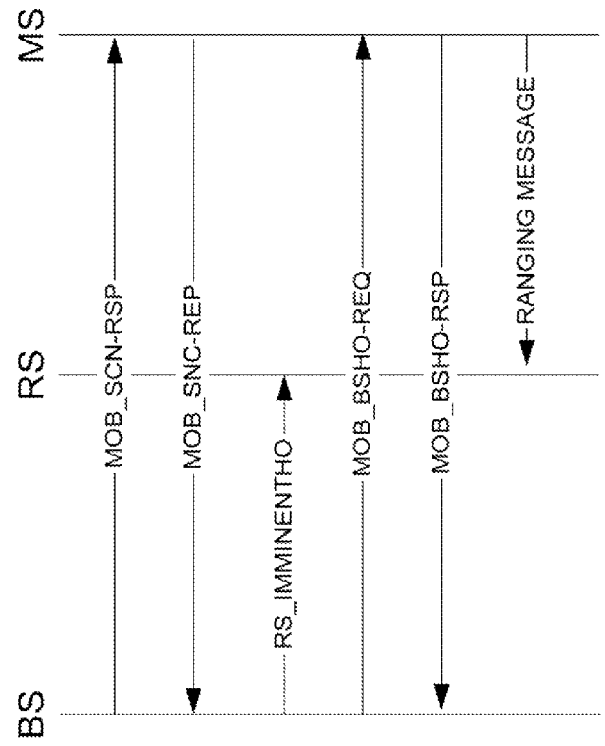

400

700

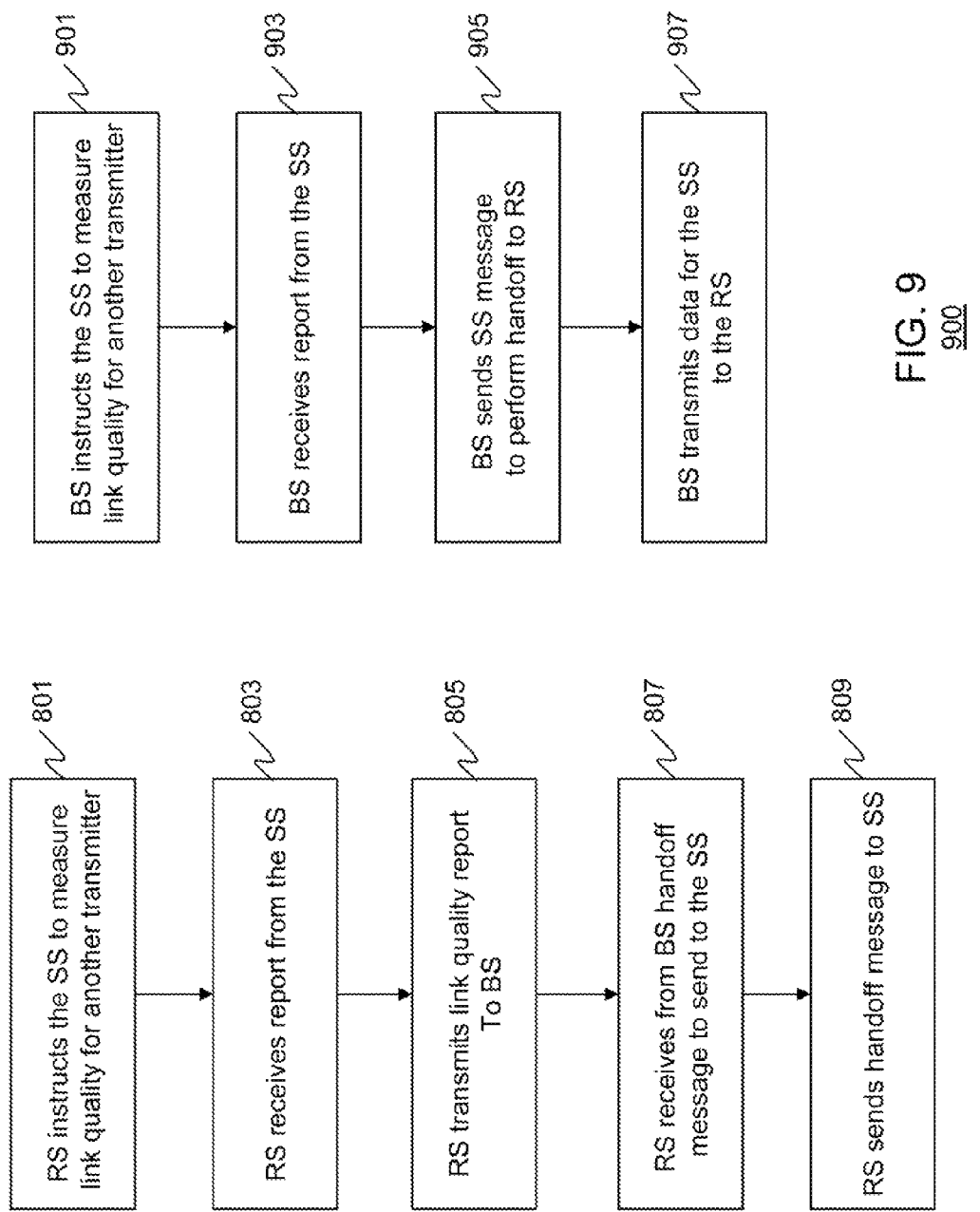

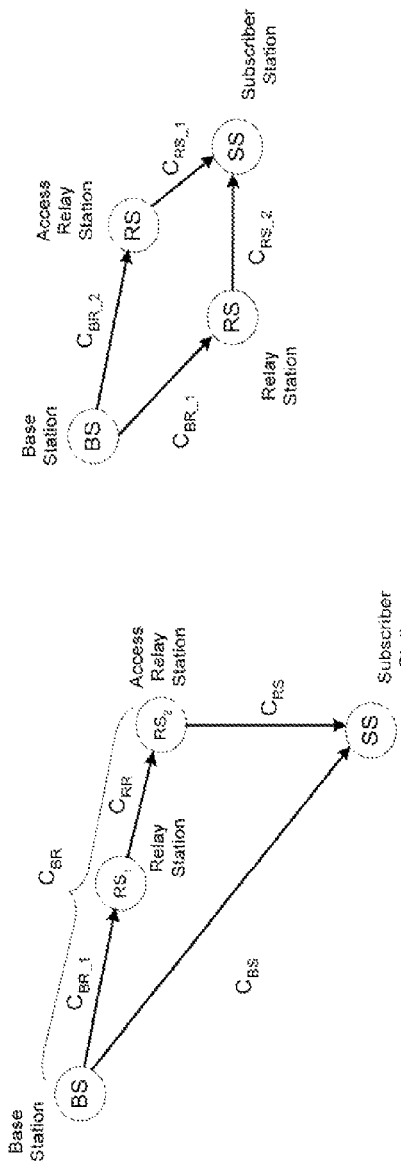
FIG. 10
1000
FIG. 11
1100
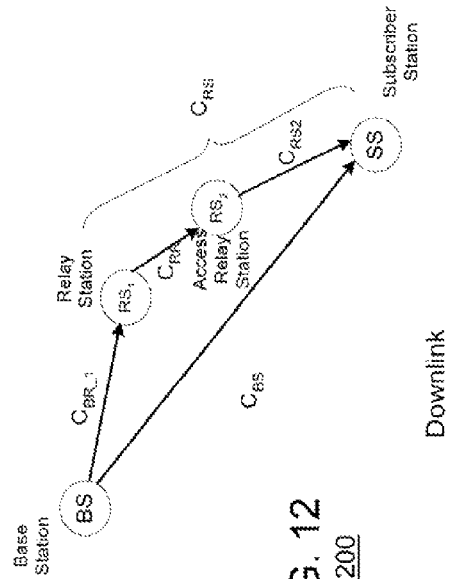
FIG. 12
1200

METHOD AND APPARATUS FOR DETERMINING AN APPROPRIATE LINK PATH IN A MULTI-HOP COMMUNICATION SYSTEM

FIELD OF THE INVENTION

The present invention relates generally to multi-hop communication systems and in particular, to a method and apparatus for determining an appropriate link path in a multi-hop communication system.

BACKGROUND OF THE INVENTION

In cellular systems with an added multi-hop relay capability, such as the communication system being developed under IEEE 802.16j, there is a need to select whether to use a direct base station to subscriber station transmission path or a relayed transmission path. Simple techniques used to choose between the two do not take into account the capacity lost by the activation of the base station to relay station link. For example, a particular subscriber station might have an RSSI from a relay station that is stronger than the RSSI from the direct base station link. Based on RSSI alone, the subscriber station might then request that the downlink path include a hop through the relay. However, this is basically a "greedy" approach which does not account for the channel capacity lost in the transmission from the base station to the relay station.

Hence, there is a need to develop an efficient routing algorithm for selecting routes based on meaningful routing metrics and to define the signaling necessary to perform routing operations.

BRIEF DESCRIPTION OF THE DRAWINGS

FIG. 1 illustrates uplink and downlink communications within a relay-capable communication system.

FIG. 2 is a call flow diagram showing the exchange of messages between a base station, a relay station, and a subscriber station during downlink handoff of the subscriber station from the relay station to the base station.

FIG. 3 is a call flow diagram showing the exchange of messages between a base station, a relay station, and a subscriber station during downlink handoff from the base station to the relay station.

FIG. 8 is a flow chart for RS messaging in accordance with one aspect of the invention.

FIG. 9 is a flow chart for BS messaging in accordance with one aspect of the invention.

FIG. 10 illustrates a case where more than one relay may be included in the path between the base station and the subscriber station. It also illustrates an example where the link quality $C_{BR}$ may be considered as a composite link quality between the base station and all of the relays in a link path.

FIG. 11 illustrates a situation where there is more than one potential candidate relay for establishing the path between the base station and the subscriber station.

FIG. 12 illustrates a case where more than one relay may be included in the path between the base station and the subscriber station. It also illustrates an example where the link quality $C_{RS}$ may be considered as a composite link quality between all of the relays and the subscriber station in a link path.

DETAILED DESCRIPTION OF THE DRAWINGS

Figure 5:
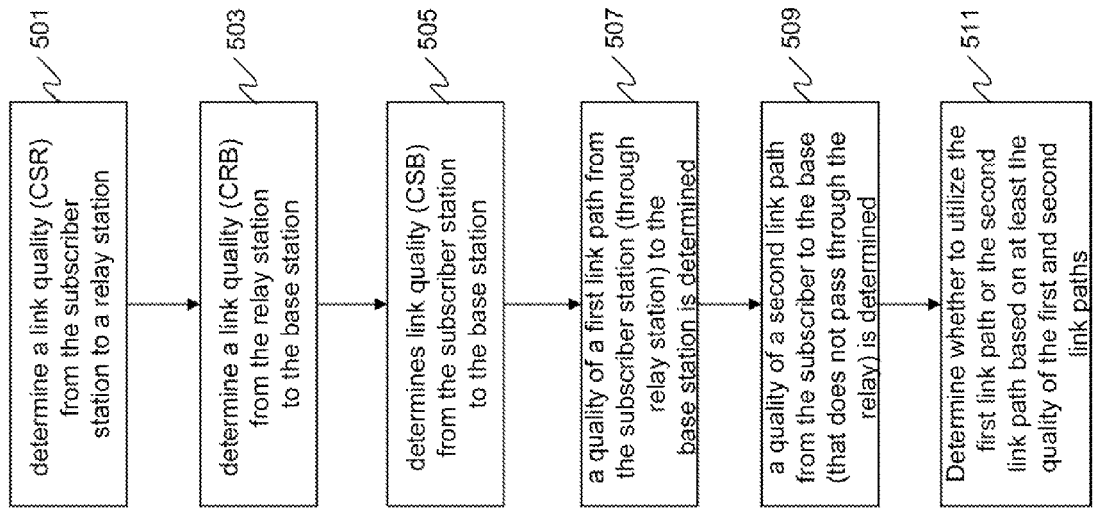
FIG. 5 is a flow chart showing the operation of the base station of FIG. 4 when determining a best uplink path for a subscriber station.

In order to address the above-mentioned need, an efficient routing algorithm for selecting routes based on meaningful routing metrics is described herein. In this application, a subscriber station is sometimes referred to as an 'SS' or MS, a relay station as a 'RS', and a base station as a 'BS' or a 'BTS'. During operation, a determination of link quality ($C_{SR}$) is made from the subscriber station to a relay station. Additionally, a determination of link quality ($C_{RB}$) is made from the relay station to the base station, and a determination of link quality ($C_{SB}$) is made from the subscriber station to the base station. A quality of a first link path from the subscriber station to the base station that passes through the relay station is determined based on at least the link qualities (Csr, Crb) and a quality of a second link path from the subscriber station to the base station that does not pass through the relay station is determined based on at least the link quality (Csb). Finally, a determination is made whether to utilize the first link path or the second link path from the subscriber station to the base station based on at least the quality of the first and second link paths.

Some of the benefits that may be realized with some embodiments of the invention include increased link data rate, increased range, increased system capacity, backward compatibility with IEEE 802.16e mobiles, improved route selection, and independently optimized route selection on the downlink and uplink (e.g., since the transmit power may be different on the downlink and uplink).

Turning now to the drawings, wherein like numerals designate like components, FIG. 1 illustrates uplink and downlink communications within relay-capable communication system 100. As shown in FIG. 1, there exist two possible routes for the downlink and uplink in a system that allows a maximum of one relay in the route between the base station and the subscriber station. The one relay case is shown as an example, and generally the system may allow multiple relays in the route or path between the base station and subscriber station. A route could also include two or more relays in parallel at some point in the path. The capacity, or possibly some other link metric, of each hop or link is represented by $C_{xy}$, where x is the source of the hop and y is the destination of the hop. Note that for the example of FIG. 1, x and y can take on labels of B for the base station, R for the relay station, and S for the subscriber station.

For the case where the channel resources are dynamically divided between the base station and the relay station (e.g., time division multiplexing on a common channel frequency), the net capacity of the base station to relay station to subscriber station path is given by $$C_{BR-RS} = \left(\frac{1}{C_{BR}} + \frac{1}{C_{RS}}\right)^{-1}$$

and the net capacity of the subscriber station to relay station to base station path is given by:

$$C_{SR-RB} = \left(\frac{1}{C_{SR}} + \frac{1}{C_{RB}}\right)^{-1}.$$

Therefore, the relay should not be included in the downlink path unless $C_{BR\text{-}RS} > C_{BS},$ and the relay should not be included in the uplink path unless $C_{SR\text{-}RB} > C_{SB}.$ Note that these capacity values are achieved with optimal resource allocation (e.g., optimal time sharing of the channel) for each of the two links. In practice, $C_{BR\text{-}RS}$ can be much lower. For instance, if the duty cycle is 50% (i.e., the source and the relay are each allocated 50% of the resources), the capacity is given by:

$$C_{SR-RB} = \frac{1}{2}\min(C_{SR}, C_{RB}).$$

A simple numerical example can be shown to explain why using only SNRs of the base to subscriber link and the relay to subscriber link is not optimal: assume the following values for the SNRs of the various links (in dB):

- base station to relay station: 14 dB with a Shannon capacity of 4.7 b/s/Hz; the quality of this link is ignored in conventional subscriber-assisted routing
- relay station to subscriber station: 10 dB with a Shannon capacity of 3.46 b/s/Hz; and
- base station to subscriber station: 6 dB with a Shannon capacity of 2.3 b/s/Hz.

Using only SNR values as seen by the subscriber station, it seems to make sense to use the relay on the downlink since the relay station to subscriber station SNR is 4 dB higher than the base station to subscriber station SNR. However, in terms of capacity, it is actually better to use the direct base station to subscriber station link since the net capacity of the relayed link is 1.98 b/s/Hz, which is lower than 2.3 b/s/Hz. Using the relay based on SNR would result in a 13% capacity loss. Note that with suboptimal resource allocation policies (e.g., constrained resource partitioning), the capacity loss of RF-based routing decisions can be even larger. As a result, if SNR is used to assist with routing decisions, it should be converted into a metric which is more reflective of the link efficiency (e.g., data rate, capacity, modulation/coding rate, etc.), and the quality of the link between the base station and relay station should additionally be taken into account.

In order to address this issue, in the present invention a determination of link quality ($C_{SR}$) is made from the subscriber station to a relay station.

Additionally, a determination of link quality ($C_{RB}$) is made from the relay station to the base station, and a determination of link quality ($C_{SB}$) is made from the subscriber station to the base station. A quality of a first link path from the subscriber station to the base station that passes through the relay station is determined based on at least the link qualities (Csr, Crb) and a quality of a second link path from the subscriber station to the base station that does not pass through the relay station is determined based on at least the link quality (Csb). Finally, a determination is made whether to utilize the first link path or the second link path from the subscriber station to the base station based on at least the quality of the first and second link paths. Determining the second link quality based on at least Csb may further comprise using Csb directly as the link quality.

In an additional aspect of the invention, determination of link quality ($C_{RS}$) is made from the relay station to a subscriber station. Additionally, a determination of link quality ($C_{BR}$) is made from the base station to the relay station, and a determination of link quality ($C_{BS}$) is made from the base station to the subscriber station. A quality of a first link path from the base station to the subscriber station that passes through the relay station is determined based on the link qualities ($C_{RS}$, $C_{BR}$) and a quality of a second link path from the base station to the subscriber station that does not pass through the relay station is determined based on the link quality ($C_{BS}$).

The decision whether to utilize the relay station in the forming the link path from the subscriber station to the base station, and/or from the base station to the susbscriber station may be performed at the base station or at the relay station. For example, the relay station could collect the necessary link qualities, and determine a recommended link path. The relay station could then forward the recommendation to the base station, and the base station would make a final decision on the link path.

The invention is also applicable to situations where multiple relays exist. In this scenario, the step of determining the link quality ($C_{RB}$) from the relay station to the base station may comprise the step of determining a link quality of a relay link path from the relay station to the base station, wherein the relay station link path passes through at least an additional intermediate relay station.

$C_{SR}$, $C_{RB}$, $C_{SB}$, $C_{RS}$, $C_{BR}$, or $C_{BS}$ is preferably based on at least one of a data rate, a modulation-coding rate, an overhead-adjusted modulation-coding rate, a modulation-coding index, overhead-adjusted modulation-coding index, a link capacity, or an SNR or SINR. (Note that the terms SNR, CNR, SINR, CINR will be used interchangeably). A brief explanation of each is now given:

Link quality based on modulation-coding rate—the modulation-coding rate being used on a link, or the highest modulation-coding rate that is expected to be supportable on a link (e.g. based on channel quality, a frame error rate target, and possibly bandwidth) provides an indication of link capacity or efficiency, such as the number of information bits carried per unit of channel resource. For example, a 16-QAM modulation constellation has M=4 bits per symbol, and a channel coding (e.g. convolutional, turbo, or other) rate of R=½ reduces the information rate to ½ the value it would be without coding. So in this example, if a link is using 16-QAM with R=½ coding (or is expected to be able to support such a modulation and coding combination), the resulting modulation-coding rate is MR=2 information bits per symbol. The modulation-coding rates could be scaled, or represented in other units (e.g., b/s/Hz), or represented in other ways, if desired.

Link quality based on an overhead-adjusted modulation-coding rate—This metric is similar as the previous one, but the overhead due to e.g., pilots or control information is accounted for in the link quality metric: for instance, if the modulation-coding-rate is 3 b/s/Hz and if the overhead is 20%, the overhead-adjusted modulation-coding-rate is 3*0.8=2.4 b/s/Hz. An overhead-adjusted metric may also be referred to as a net metric.

Link quality based on data rate—This metric provides an indication of the current or expected data rate that is achievable on a particular link. It may include or exclude overhead. Preferably, it is known in advance whether overhead is included or excluded.

Link quality based on a modulation-coding index—in some systems, each supported combination of modulation and coding rate is assigned an index. Since the relationship between modulation-coding scheme and the index is known in advance, a modulation-coding index can easily be converted into a more direct link quality indicator, such as modulation-coding rate. Overhead may be included or excluded when determining the index. The index is sometimes referred to as an MCS.

Link quality based on a link capacity—Link capacity typically means either the b/s or the b/s/Hz that is supportable on a link. As such, it is quite similar to modulation-coding rate. The capacity representation could represent either the capacity of the data symbols, or it could be adjusted for the control and pilot overheads (net capacity).

Link quality based on SNR/SINR—$C_{xy}$ may be determined based on SNR or SINR, such as by coverting an SNR of a link between x and y to a link efficiency metric. One example of this is a modified Shannon limit $C_{xy} \approx \log_2(1+\alpha SNR_{xy})$, where $\alpha$ is a calibration factor and $SNR_{xy}$ is the SNR of the link between entity x and entity y. The result can be adjusted for overhead as well. Other methods for converting an SNR or SINR to a capacity, or link efficiency, or date rate, or the like could also be used.

Other link quality metrics that may be useful include RSSI, path loss, and potentially others as well.

In addition, $C_{SR/RS}$, $C_{RB/BR}$, or $C_{SB/BS}$ (where $C_{xy/yz}$ means either $C_{xy}$ or $C_{yz}$) may be related to a previously observed link quality (e.g., on the previous frame) between the subscriber station and the relay, the relay and the base station, or the subscriber station and the base station, or may be related to an anticipated link quality (e.g., the value predicted for the next frame). The determination of $C_{SR}$, $C_{RB}$, and similarly of $C_{RS}$ and $C_{BR}$ may include the impact more than one relay (e.g., considering $C_{SR}$, if there are two relays in the path being evaluated in terms of link quality, then $C_{SR}$ is the net or composite link quality originating at the subscriber station and ending at the last relay in the path).

Consider now performing a routing decision for an IEEE 802.16e subscriber station deployed in an IEEE 802.16j system. As specified by the IEEE 802.16j PAR, the underlying assumption is that, in an IEEE 802.16j system, the air-interface on the subscriber station to base station and subscriber station to relay station links remains the same as in the IEEE 802.16e system. Specifically, every base station and relay station transmits a unique preamble, which enables the initial channel acquisition by the subscriber stations. Furthermore, the initial network entry procedure for a subscriber station remains unchanged as specified in the IEEE 802.16e standard. Following this network entry procedure, a subscriber station admitted into the network will be connected to the nearest base station or relay station, whichever is closest. The nearest base station or relay station is determined based on the measured strength of the preamble. From the subscriber station side, it is impossible to distinguish between being connected to a relay station or a base station (the subscriber station always assumes that it is connected to a base station in order to fully maintain backwards compatibility with 802.16e).

Based primarily on this configuration, but not limited to this configuration, the present invention provides for practical routing strategies for handoff or link path (route) selection from relay station to base station, and handoff or link path selection from base station to relay station, each of which can be decided independently between the downlink and uplink if desired. In order to simplify the system operation, the base station may determine the path on the uplink and then optionally use the same path for the base station to subscriber station link (downlink). For convenience, it is assumed that the base station performs centralized routing decisions in its cell and signals the routes to the relevant relay stations and subscriber stations. In alternate embodiments, the relay station can independently collect information and initiate a handoff recommendation to the base station rather than relying on the base station to initiate the handoff process, or the base station may instruct a relay station to collect some or all of the needed information.

In the present invention, mobility handoff messages defined in the IEEE 802.16e are used in a new way—for signaling the routes to the subscriber stations and to define the necessary relay station to base station messages to ensure that handoff and routing operations can be seamlessly performed. In the TDD more of 802.16, the relay station, the base station and the subscriber station can all communicate on a shared radio frequency channel (e.g., a 5 MHz channel for an IEEE802.16e system operating with the OFDMA mode). Four cases need to be considered:

1. subscriber station linked to relay station, uplink
2. subscriber station linked to relay station, downlink
3. subscriber station linked to base station, downlink
4. subscriber station linked to base station, uplink Note that the routes on the uplink and on the downlink may need to be different for best performance: for instance, the downlink may be a direct base station to subscriber station link whereas the uplink could be routed through one or more relays. However, in order to simply the system operation at the cost of potentially reduced performance, it may be decided to base the route determination for both the uplink and downlink on the uplink path only or the downlink path only.

Case 1: Subscriber Station Linked to Relay Station, Downlink

The process is as follows and is illustrated in FIG. 2:

1. The base station requests the relay station to report $C_{RS}$. As described above, this can be represented as an MCS index or another link quality metric. Since the subscriber station is already connected to the relay station, the relay station would normally already know this value based on the MCS used by the relay station when transmitting to the subscriber station. Alternatively, the SNR channel quality information (CQI) feedback from the subscriber station could be used to derive a $C_{RS}$ estimate.
2. The base station requests the relay station to obtain and report downlink Carrier to Interference Noise Ratio (CINR) of base station to subscriber station link.
   a. The relay station requests the subscriber station to measure and report $CINR_{BS}$, the CINR of the base station to subscriber station link (alternatively, RSSI could be used). This report is received by the relay station.
   b. the relay station reports $CINR_{BS}$ to the base station.
3. The base station computes $C_{BR-RS}$ as a function of at least $C_{RS}$ and $C_{BR}$. Note that $C_{BR}$ may be known based on the MCS used by the base station when transmitting to the relay station, and $C_{RS}$ was obtained in step 1.
4. The base station compares $C_{BR-RS}$ and $C_{BS}$ and makes the determination whether to use the relay station. If $C_{BR-RS} < C_{BS}$, END. Else go to Step 5.

5. The base station requests relay station to initiate subscriber station handoff (or a new link path) to the base station.
   a. the relay station initiates subscriber station handoff to the base station.
   b. the subscriber station acknowledges the handoff command.
   c. the subscriber station ranges to the base station.

Relay Station Capacity Estimation Step

If the subscriber station is connected to the relay station, the relay station can estimate $C_{RS}$ based on the MCS used when transmitting to the subscriber station, or alternatively based on Channel Quality Information (CQI) feedback from the subscriber station. The base station can send a request to the relay station to measure and report $C_{RS}$. The $C_{RS}$ is then signaled back to the base station. The CQI estimates obtained at the subscriber station are based on the pilot signal transmitted by the relay station. The relay station pilot signal could be provided in a number of different ways. Specifically, the relay station could be implemented as a complete base station, or the relay station could transmit only the pilot signal and the downlink data assigned to it. Also, the relay station could only transmit in a specific downlink region of the frame for which the mobile could be requested to report CQI. Thus, the relay station may notify the subscriber station of a channel resource upon which the relay station may receive a signal from the subscriber station to assist in measuring $C_{SR}$. After receiving the notification, the subscriber station would report the CQI for that particular resource.

Base Station Capacity Estimation Process

Estimation of $C_{BS}$ represents the biggest challenge, as the subscriber station is not directly communicating with the base station. However, existing 802.16e messages can be used in a new way to obtain a measure of the base station to subscriber station link quality at the relay station. First, the base station requests the relay station to obtain $CINR_{BS}$, the base station to subscriber station CINR. In order to do so, the relay station sends the subscriber station an IEEE 802.16 MOB_SCN-RSP message or the like, where the neighbor list only contains the base station BSID, and where it indicates the subscriber station to report the CINR. In other words, the existing MOB_SCN-RSP message is tailored to notify the subscriber station to report the base station to subscriber station CINR. The subscriber station replies using the IEEE 802.16 MOB_SCN-REP message or the like. At this stage, the relay station knows $CINR_{BS}$. It then reports it to the base station, which can estimate $C_{BS}$ using, e.g., the modified Shannon model. Alternatively, MOB_SCN-RSP can be used to solicit RSSI information that could be used for capacity estimation (but SINR is preferred). Also, depending on the implementation, the relay station could perform the conversion from $CINR_{BS}$ to $C_{BS}$ and report $C_{BS}$ rather than $CINR_{BS}$. Yet, in another alternative solution, the subscriber station could be requested by the relay station to report CQI channel feedback for the base station. For this scheme, signaling defined for the fast base station switching (FBSS) protocols in the IEEE 802.16e standard or the like could be employed.

Routing Step

If the relay station and base station are at least occasionally maintaining their communication link then the $C_{BR}$ metric may already be known at the base station. Upon obtaining estimates of, $C_{RS}$ and $C_{BS}$, the base station computes $C_{BR-RS}$ and can compare it to $C_{BS}$ to decide whether the subscriber station should handoff to the base station or not. If no handoff is required, the procedure stops. If handoff is required, the base station performs the Handoff Step.

Handoff (New Link Path) Process

If the subscriber station needs to handoff to the base station, the base station preferably notifies the relay station to initiate the handoff process. The receipt of this message causes the relay station to instruct the subscriber station to directly connect to the base station. This is accomplished by sending a message, such as MOB_BSHO-REQ or the like to the subscriber station specifying the base station ID, and only this ID, in the recommended neighbor list, and also specifying that this is a mandatory request. The subscriber station then proceeds with a handover (HO) process to the base station, as specified in the IEEE 802.16e standard. As part of the HO process, the subscriber station acquires the downlink base station control channel and sends a ranging request to the base station on the uplink.

New Signaling Messages

In order to enable the above-described procedure, in one embodiment eight 802.16j specific messages are defined:
  RS_CAP_DL-REQ: used by the base station to request relay station to report $C_{RS}$.
  RS_CAP_DL-RSP: used by the relay station to report $C_{RS}$.
  RS_MEAS_SS-REQ: to notify the relay station to obtain $CINR_{BS}$.
  RS_MEAS_SS-RSP: used by the relay station to report $CINR_{BS}$.
  RS_HANDOFF_REPORT-REQ: This can be an alternative to RS_CAP_DL-REQ and RS_MEAS_SS-REQ. It is a configurable message that can specify to report either $C_{RS}$ or $CINR_{BS}$, or both.
  RS_HANDOFF_REPORT-RSP: The response message from the relay station containing the information requested by RS_HANDOFF_REPORT-REQ.
  RS_INITIATEHO-REQ: to have the relay station sending the handoff command to the subscriber station.
  RS_INITIATEHO-RSP: acknowledgment of the RS_INITIATEHO-REQ message (optional, but probably desirable for robustness).

Note that these messages are exchanged between the base station and the relay station and are completely transparent to the subscriber station. Also note that the names of the messages are examples, and may be different in an actual implementation.

The process is illustrated by the bounce diagram shown in FIG. 2. More particularly, FIG. 2 is an example call flow diagram showing the exchange of messages between the base station, the relay station, and the subscriber station during downlink link path determination/selection or handoff of the subscriber station from the relay station to the base station. As shown, in order to initiate a downlink handoff, the process begins with the base station sending a RS_CAP_DL-REQ message to the relay station. As described above, the message causes the relay station to report $C_{RS}$ to the base station in a RS_CAP_DL-RSP message. The base station next transmits a RS_MEAS_SS-REQ message to the relay station to notify the relay station to obtain $CINR_{BS}$. The $CINR_{BS}$ is obtained by the relay station transmitting a MOB_SCN-RSP message to the subscriber station. This causes the subscriber station to measure $CINR_{BS}$ and transmit this information to the relay station in the form of a MOB_SCN-REP message. $CINR_{BS}$ is transmitted from the relay to the base via the relay station transmits a RS_MEAS_SS-RSP message to the base. In response, the base station transmits a RS_INITIATEHO-REQ to the relay station causing the relay station to send a handoff command (MOB_BSHO-REQ) to the subscriber station. The subscriber station replies (optionally) with a RS_INITIATEHO-RSP acknowledging the handoff is taking place. Finally, a ranging message is transmitted from the subscriber station to the base station as part of the handoff procedure.

The process described above is a base station-initiated process. However, since the relay station already has all of the information needed by the process except for the CINR of base station to subscriber station link, the relay station can request the subscriber station to measure and report $C_{BS}$, or link quality necessary to compute $C_{BS}$: the relay station could autonomously request $CINR_{BS}$ reports from the subscriber station (e.g., periodically, or when is $C_{RS}$ low), for example by using the MOB_SCN-RSP message. $C_{BS}$ can also be obtained at the relay station from the base station: the relay station could instruct the base station to request the subscriber station to measure and report $C_{BS}$, by using for instance the MOB_SCN-RSP message. The base station could then forward $C_{BS}$ (or link quality necessary to compute $C_{BS}$) to the relay station. The relay station could then provide an unsolicited report to the base station with the gathered information and a link path recommendation such as a recommendation to initiate a handoff. Hence, the process can be relay station initiated while still being ultimately controlled by the base station. Practically, this means that relay station_HANDOFF_REPORT-RSP or similar messages can be send by the relay station to the base station in an unsolicited fashion. The relay station can then initiate the handoff process and instruct the subscriber station to utilize the base station, for instance by sending an IEEE 802.16-2005 MOB_BSHO-REQ message. The relay station can also notify the base station of an imminent susbscriber connection in order to improve the handoff reliability.

Case 2: Subscriber Station Linked to Relay Station, Uplink

The process for handoff of the uplink communication is as follows:
1. The base station requests the relay station to report $C_{SR}$.
2. The base station measures $C_{SB}$ and $C_{RB}$.
3. The base station computes $C_{SR-RB}$ as a function of at least $C_{SR}$ and $C_{RB}$ and decides which link path to use.
4. The base station compares $C_{SR-RB}$ and $C_{SB}$ and makes the determination of whether to use the relay station in the path from the subscriber station to the relay station. If $C_{SR-RB} < C_{SB}$, END. Else go to Step 5.
5. The base station requests the relay station to initiate subscriber station handoff to the base station.
6. The relay station initiates subscriber station handoff to the base station.
7. The subscriber station acknowledges the handoff command.
8. The subscriber station ranges to base station.

The above process is actually quite similar as on the downlink. A major difference is that that the base station requests the relay station to report $C_{SR}$: in order to enable this operation, the base station may provide to the relay station an indication of the subscriber station ID (Such as one of the subscriber station's CIDs) or may provide an indication of a channel resource upon which the relay may receive a signal from a subscriber station in order to assist in measuring the link quality. Also, $C_{SR}$ can be received from the susbscriber station either in a solicited or an unsolicited manner. Another difference is that the base station can perform the $C_{SB}$ measurement with a simpler process. There are three possibilities: (i) a centralized scheduler is utilized at the base station; (ii) decentralized schedulers are utilized at the relay stations; (iii) a centralized scheduler is utilized at the base station and map control information is multicast from the base station and the relay stations.

For (i), a centralized scheduler, the base station is aware of the relay station impending uplink transmissions and can utilize embedded uplink pilots to estimate $C_{SB}$. For (ii), with a decentralized scheduling algorithm, the base station is informed of the impending subscriber station transmission by the relay station that has scheduled the transmission. For (iii), the base station and the relay stations are aware of the map control information by the nature of the multicast process. Note that these methods are based on the base station "sniffing" the uplink transmissions of the subscriber station to the relay station. In some cases of spatial reuse, the base station may need to leave a portion of its uplink resources unused to allow accurate estimation of the uplink subscriber station to base station SINR.

Note that in some embodiments, the base station and/or relay station may not be aware of the transmit power used by the subscriber station, which can make determining the link quality $C_{SB}$ and/or $C_{SR}$ more difficult. Therefore, the subscriber station may be requested to provide an indication of its transmit power to the base station or the relay station to assist in determining link quality and/or determining the link path. If the relay station requests the subscriber station to report its transmit power, then after receiving an indication (or message) containing the transmit power, the relay station can forward the transmit power information to the base station assist in determining link quality and/or determining the link path. Knowing the transmit power may enable the base station to determine path loss, or may enable the base station to compensate for the fact that the subscriber station may be assigned a different transmit power on the different possible link paths, thus providing the capability to compensate for the impact of different transmit powers on the link qualities used for determining the link path. Such compensation may be performed on the link qualities themselves, or could be included in the processing of the link qualities. Also, in some embodiments, if the base station knows the subscriber station transmit power, it may transmit this information to the relay station to assist the relay station in determining the link quality $C_{SR}$.

The determination of $C_{RB}$ is straightforward since there is an established link between the relay station and the base station. $C_{RB}$ can be determined at least in part as a function on the modulation and coding scheme or the modulation and coding rate used between the relay station and the base station.

When determined that the subscriber station should establish a direct path with the base station (without using the relay station), the base station sends an instruction to the relay station to initiate the handoff. The relay station then sends an instruction to the base station to handoff to the base station. In the context of the IEEE 802.16 standard, this message can be a MOB_BSHO-REQ message.

Alternative Routing Step (Transparent Relaying)

In certain network configurations, it is possible to avoid the overhead of the HO procedure by performing transparent relaying. Specifically, in a system deployment with relatively small cell sizes and synchronized base station and relay station transmissions, a subscriber station that is attached to the relay station is also roughly time-aligned with the base station. In this case, the control channel data continues to be relayed through the relay station, whereas payload data can be directly transmitted and received by the base station.

In order to enable this process, one embodiment provides two new IEEE 802.16j specific messages:

RS_CAP_UL-REQ: used by the base station to request relay station to report $C_{SR}$.

RS_CAP_UL-RSP: used by the relay station to report $C_{SR}$.

Additionally, for the decentralized scheduling case, a message is needed for indicating the resource assignment of the subscriber station on the uplink:

SS_UL_RESOURCE_REPORT

Finally, as noted earlier, the relay station could also report the information in an unsolicited fashion. Again, here and throughout the description, the specific message names are only examples—the functionality of the message is more important than the name.

Alternatively, all the routing path decision can be made by the relay station. The relay station may compare $C_{SR-RB}$ and $C_{SB}$ and make the determination whether to use the relay station. In that case, the relay station may receive $C_{SB}$ from the base station. Once the path determination is done by the relay station, the relay station may send a link path recommendation to the base station. $C_{RB}$ can be computed at the relay station or sent by the base station to the subscriber station. Once the link path determination is done by the relay station, the relay station may instruct the susbscriber station to connect to the base station: in the IEEE 802.16-2005 context, this can be done by the relay station sending a MOB_BSHO-RSP message to the subscriber station with the base station ID. In order to improve the robustness of the handoff process, the relay may notify the base station of an imminent subscriber connection.

Case 3: Subscriber Station Linked to Base Station, Downlink

In this scenario, the subscriber station is now linked to the base station, and the option of having it routed via the relay is under consideration. A simple method for this process is described below and is shown in FIG. 3. In particular, FIG. 3 is a call flow diagram showing the exchange of messages between a base station, a relay station, and a subscriber station during downlink handoff from the base station to the relay station. During operation:

1. The base station requests the subscriber station to measure and report downlink CINR of the relay station to subscriber station link.
2. The base station computes $C_{BR-RS}$ as a function of at least $C_{RS}$ and $C_{BR}$ and decides which link path to use.
3. The base station compares $C_{BR-RS}$ and $C_{BS}$ and makes the determination whether to use the relay station. If $C_{BR-RS} < C_{BS}$, END. Else go to Step 4.
4. The base station notifies the relay station of an imminent subscriber station handoff.
5. The base station initiates subscriber station handoff to the relay station.
6. The subscriber station acknowledges the handoff command.
7. The subscriber station ranges to relay station.

This process is quite similar with the one described for case 1, but the base station can determine $C_{BS}$ since there is a direct link between the base station and the subscriber station. Since the base station and the subscriber station exchange data, the base station can for example determine what the maximum sustainable MCS is for a given target FER by counting the ACK messages received from the subscriber station for any given MCR. Also, the subscriber station can send back CQI information to the base station. However, the base station must obtain the CINR (or RSSI) of the relay station to subscriber station link in order to estimate $C_{RS}$. The base station can evaluate $C_{RS}$ with link information sent by the subscriber station at the base station's request. In order to do so, the base station sends the subscriber station a MOB_SCN-RSP message, where the neighbor list only contains the relay station BSID, and where it indicates the subscriber station to report the CINR. In other words, the existing MOB_SCN-RSP message is tailored to notify the subscriber station to report the relay station to subscriber station CINR. The subscriber station replies using the MOB_SCN-REP message. At this stage, the base station knows $CINR_{RS}$, and can estimate $C_{RS}$ using, e.g., the modified Shannon model. The base station also knows $C_{BR}$ from the MCS used when transmitting to the relay station, so that $C_{BR-RS}$ can also be computed.

If a handoff is necessary, the base station may notify the relay station of an imminent subscriber station handoff. While not necessary, this step may improve the handoff reliability. The base station then initiates the handoff process. In any case, when a handoff from the base station to the relay is needed, the base station sends an instruction to the subscriber station to use the relay. Such an instruction comprises a cell ID associated with the relay station. For instance, the base station may send an IEEE 802.16-2005 MOB_BSHO-REQ message.

New Signaling Messages

One optional 802.16j specific message need to be defined:

relay station_IMMINENTHO: to notify the relay station that the subscriber station is about to handoff. This message is optional.

The process is illustrated in FIG. 3 illustrating a downlink handoff from the base station to the relay station.

Case 4: Subscriber Station Linked to Base Station, Uplink

When the subscriber station is linked to the base station on the uplink, the process to determine the optimal route is as follows:

1. The base station requests the relay station to measure and report $C_{SR}$.
2. The base station computes $C_{SR-RB}$ as a function of at least $C_{SR}$ and $C_{RB}$ and decides which link to use.
3. The base station compares $C_{SR-RB}$ and $C_{SB}$ and makes the determination whether to use the relay station. If $C_{SR-RB} < C_{SB}$, END. Else go to Step 4.
4. The base station notifies the relay station of an imminent subscriber station handoff.
5. The base station initiates subscriber station handoff to the relay station.
6. The subscriber station acknowledges the handoff command.
7. The subscriber station ranges to the relay station.

Note that the relay station needs to report $C_{SR}$ even though the subscriber station is not connected with the relay station. In order to perform this step, the relay station needs to be aware of when the subscriber station transmits. in order to enable this operation, the base station may provide to the relay station an indication of the subscriber station ID (Such as one of the subscriber station's CIDs) or may provide an indication of a channel resource upon which the relay may receive a signal from a subscriber station in order to assist in measuring the link quality. A simple way to accomplish this task is for the relay to decode the uplink_MAP that the base station sends. If this is not possible (because the relay station uplink_MAP is sent at the same time as the base station uplink_MAP: case of synchronized networks), the base station needs to indicate to the relay station where/when it should expect a subscriber station uplink transmission, by using a subscriber station_uplink_RESOURCE_REPORT. Also, the relay station needs to be aware of the transmit power of the subscriber station in order to perform an accurate link quality estimation. The transmit power of the subscriber station may be provided to the relay station by the base station. In any case, the relay station needs to send $C_{SR}$ (or link quality information necessary to compute $C_{SR}$) to the base station, in a solicited or an unsolicited manner. Note that the description of the subscriber station transmit power aspects from case 2 is also applicable to case 4.

When a decision is made that the susbscriber station should connect to the relay station, the base station notifies the subscriber station to utilize the relay station. The base station needs to provide the subscriber station with at least a cell ID associated with the relay station, and, in the context of the IEEE 802.16-2005 standard, can use the MOB_BSHO-RSP message. The base station may also optionally notify the relay station of an imminent subscriber station connection in order to increase the robustness of the handoff process. Alternatively, the process may be done in a transparent manner with the subscriber station being unaware of the fact that its transmissions are relayed by the relay station. For that purpose, the base station instructs the relay station to monitor and relay transmissions from the subscriber station when it is determined to utilize the relay station in forming the link path between the subscriber station and the base station, but does not send any instruction to the subscriber station.

Also note that the process could be initiated by the relay station rather than the base station, as described for the other scenarios. For example, the relay station can measure $C_{SR}$ in an unsolicited fashion, and it knows $C_{RB}$ based on the MCS it uses when transmitting to the base station. However, the relay station does not know $C_{SB}$. As a result, the relay station could send $C_{SR}$ to the base station in an unsolicited fashion if the relay station determines that $C_{SR\text{-}RB}$ has a large enough value (indicative that a handoff to the relay station looks promising). Alternatively, the relay station may compare $C_{SR\text{-}RB}$ and $C_{SB}$ and make the determination whether to use the relay station. In that case, the relay station may receive $C_{SB}$ from the base station. Once the path determination is done by the relay station, the relay station may send a link path recommendation to the base station.

Figure 4:
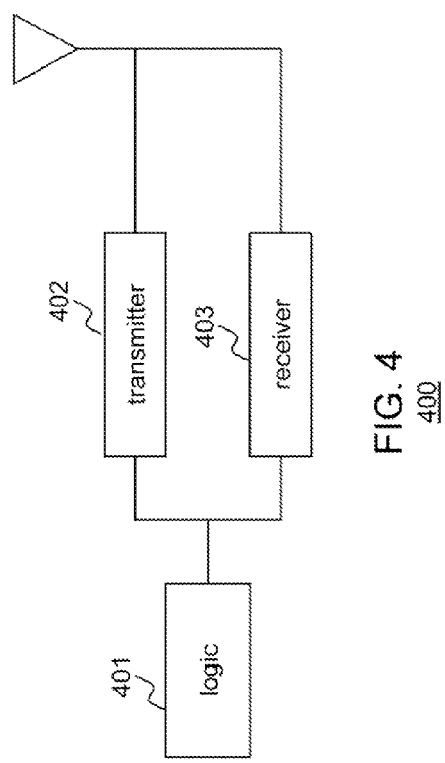
FIG. 4 is a block diagram of a base station.

FIG. 4 is a block diagram of a base station 400. As shown, base station 400 comprises logic circuitry 401, transmit circuitry 402, and receive circuitry 403. Logic circuitry 401 preferably comprises a microprocessor controller, such as, but not limited to a Freescale PowerPC microprocessor. In the preferred embodiment of the present invention logic circuitry 401 serves as means for controlling base station 400, and as means for analyzing received message content, and means for determining a best uplink or downlink path between a subscriber station and base station 400. Transmit and receive circuitry 402-403 are common circuitry known in the art for communication utilizing a well known network protocols, and serve as means for transmitting and receiving messages. For example, transmitter 402 and receiver 403 are well known IEEE 802.16 transmitters and receivers that utilize the IEEE 802.16 network protocol. Other possible transmitters and receivers include, but are not limited to transceivers utilizing Bluetooth, IEEE 802.11, or HyperLAN protocols.

FIG. 5 is a flow chart showing the operation of base station 400 when determining a best uplink path for a subscriber station. The logic flow begins at step 501 where logic circuitry 401 determines a link quality ($C_{SR}$) from the subscriber station to a relay station. As described above, this step preferably comprises transmitting a message via transmitter 402 to the relay station to obtain $C_{SR}$. In the situation where the subscriber station is in communication with the relay station (case 2), the base station requests the relay station to report $C_{SR}$. In the situation where the subscriber station is in communication with the base station (case 4), the base station requests the relay station to measure and report $C_{SR}$ by preferably decoding the uplink_MAP that the base station sends. In either case a message containing $C_{SR}$ is received by receiver 403 and provided to logic circuitry 401.

At step 503, logic circuitry determines a link quality ($C_{RB}$) from the relay station to the base station. There are several possible ways for the base station to determine $C_{RB}$, (e.g., based on the MCS or MCR or data rate used for the relay to base link, or based on the SNR of the relay to base link, etc.).

At step 505, logic circuitry determines link quality ($C_{SB}$) from the subscriber station to the base station. In the situation where the subscriber station is in communication with the relay station (case 2), the BS may need to monitor a transmission from the SS in order to determine $C_{SB}$ based on e.g., the CINR observed on the monitored transmission. In the situation where the subscriber station is in communication with the base station (case 4), the BS should already know the MCS/data rate/CINR etc. of the SS to BS link, and such information can be used for determinining $C_{SB}$.

Once $C_{SR}$, $C_{RB}$, and $C_{SB}$ are determined, the logic flow continues to step 507 where a quality of a first link path from the subscriber station to the base station (that passes through the relay station) is determined by logic circuitry 401 based on the link qualities $C_{SR}$ and $C_{RB}$. Next, at step 509 a quality of a second link path from the subscriber station to the base station (that does not pass through the relay station) is determined by logic circuitry 401 based on the link quality ($C_{SB}$). Finally, at step 511 a determination is made by logic circuitry 401 whether to utilize the first link path or the second link path from the subscriber station to the base station based on at least the quality of the first and second link paths. For example, it may be advantageous to select the second link path if $C_{SB} > C_{SR\text{-}RB}$.

Figure 6:
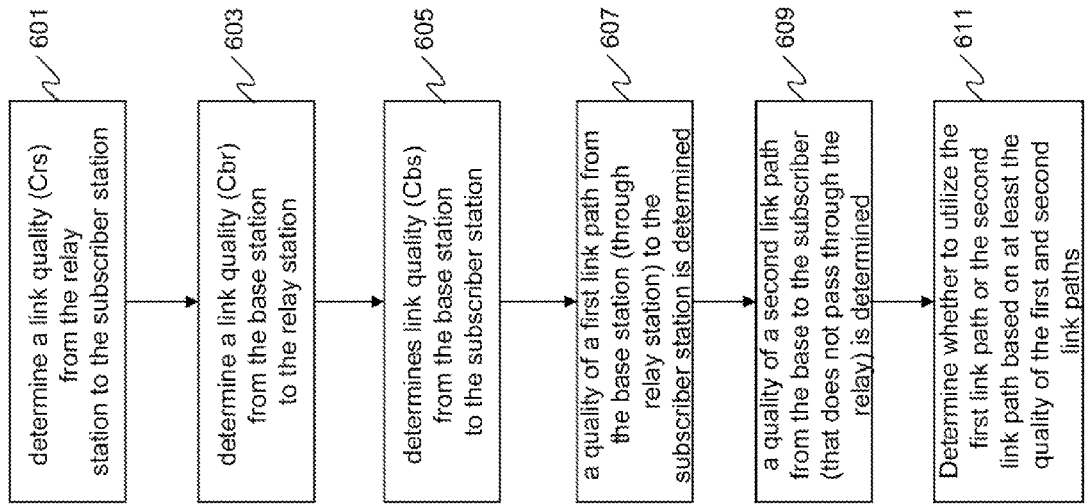
FIG. 6 is a flow chart showing operation of the base station of FIG. 4 when determining a best downlink path for a subscriber station.

FIG. 6 is a flow chart showing operation of base station 400 when determining a best downlink path for a subscriber station. The logic flow begins at step 601 where logic circuitry 401 determines a link quality ($C_{RS}$) from a relay station to the subscriber station. As described above, this step preferably comprises transmitting a request message via transmitter 402 to the relay station to obtain $C_{RS}$. In the situation where the subscriber station is in communication with the relay station (case 1), the base station requests the relay station to report $C_{RS}$. In the situation where the subscriber station is in communication with the base station (case 3), the base station requests the subscriber station to measure and report downlink CINR of the relay station to subscriber station link. In either case a message containing $C_{RS}$ is received by receiver 403 and provided to logic circuitry 401.

At step 603 logic circuitry 401 determines a link quality ($C_{BR}$) from the base station to the relay station; $C_{BR}$ is known by logic circuitry 401 and may be based on the MCS used by the base station when transmitting to the relay station. At step 605 logic circuitry 401 determines a link quality ($C_{BS}$) from the base station to the subscriber station. In the situation where the base station is communicating directly with the subscriber station, $C_{BS}$ is preferably determined based on the MCS used by the base station to transmit to the subscriber station. In the situation where the relay station is in communication with the subscriber station, the base station requests the relay station to instruct the subscriber station to measure and report downlink CINR of the base station to subscriber station link. In the latter case, the relay station then transmits a message to receiver 403 representing directly or indirectly the link quality $C_{BS}$.

Once $C_{RS}$, $C_{BR}$, and $C_{BS}$ are determined, the logic flow continues to step 607 where a quality of a first link path from the base station to the subscriber station (that passes through the relay station) is determined by logic circuitry 401 based on the link qualities $C_{RS}$ and $C_{BR}$. As discussed above, the quality may comprises a data rate. Next, at step 609 a quality of a second link path from the base station to the subscriber station (that does not pass through the relay station) is determined by logic circuitry 401 based on the link quality ($C_{BS}$). Finally, at step 611 a determination is made by logic circuitry 401 whether to utilize the first link path or the second link path from the subscriber station to the base station based on the quality of the first and second link paths. For example, it may be advantageous to select the first path if $C_{BR-RS} > C_{BS}$.

Figure 7:
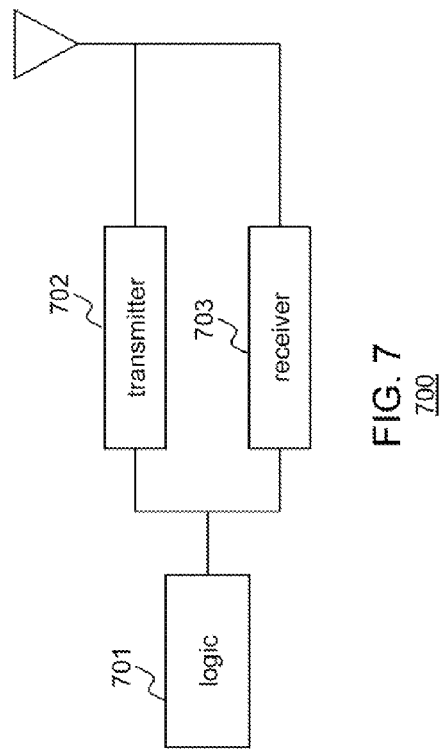
FIG. 7. is a block diagram of a relay station.

FIG. 7 is a block diagram of a relay station 700. As shown, relay station 700 comprises logic circuitry 701, transmit circuitry 702, and receive circuitry 703. Logic circuitry 701 preferably comprises a microprocessor controller, such as, but not limited to a Freescale PowerPC microprocessor. In the preferred embodiment of the present invention logic circuitry 701 serves as means for controlling relay station 700, and as means for analyzing received message content, means for determining link quality, and means for generating transmit message content. In some embodiments, logic circuitry may also include means for determining a best uplink or downlink path between a subscriber station and a base station. Transmit and receive circuitry 702-703 are common circuitry known in the art for communication utilizing predetermined protocols, and serve as means for transmitting and receiving messages. For example, when communicating with an IEEE 802.16e subscriber station, transmitter 702 and receiver 703 use an IEEE 802.16 compliant protocol, but may use either an 802.16e protocol or a different protocol when communicating with another relay station or a base station. Other possible transmitters and receivers include, but are not limited to transceivers utilizing Bluetooth, IEEE 802.11, or HyperLAN protocols.

FIG. 8 describes the message flow from the relay perspective when a subscriber station is connected to the RS. At step 801, the relay station transmits a message to a subscriber station to instruct the subscriber station to measure the link quality from another transmitter, preferably the base station. In order for the subscriber station to perform this link quality measurement, the message sent to the subscriber station by the relay station needs to indicate some form of identifier of the transmitter. At step 803, the relay station receives a message from the subscriber station containing the link quality information. At step 805, the relay station forms a link quality report message, that may include the link quality information, and transmits this quality report message to the base station. Then, at step 807, if the base station assesses that the subscriber station should be directly connected to the base station, the base station sends a command to the relay station in order to direct the relay station to send the handoff command to the subscriber station. At step 809, the relay station sends the handoff command to the subscriber station in order to direct the subscriber station to handoff to the base station.

The handoff message from the base station may also act as an implicit or explicit indicator to the relay station that the base station will accept a direct link path connection with the SS. In addition, in order to improve the reliability of the handoff process, the base station may send an acknowledgement that the base station will accept a connection with the subscriber station. Also, the process described in FIG. 8 can be initiated at the relay station's request or at the base station's request. For the latter case, before initiating the process described in FIG. 8, the relay station receives a request from a base station for the relay station to acquire the quality.

The message flow for the base station operation is described in FIG. 9 for the case when the subscriber station is connected to the base station. At step 901, the base station sends a message to the subscriber station to request the subscriber station to measure the link quality from another transmitter (a relay station). In this message, a transmitter identifier needs to be specified. At step 903, the base station receives a reply from the subscriber station with the link quality information. At step 905, the base station transmits a handoff message to the subscriber station to instruct the subscriber station to connect with the relay station. At step 907, the base station transmits data for the subscriber station to the relay station.

Other embodiments of the signaling message flows are possible. In some embodiments, the base station may receive path quality information from a relay station. In order embodiments, the base station may transmit a message to the subscriber station through the relay station instructing the subscriber station to connect with the base station.

The signaling message flow can also be adapted to handle transparent relaying. For instance, the base station may receive a message form the relay station containing the link quality information for the subscriber station to the relay station link. This message may be sent in a solicited or unsolicited manner: if solicited by the base station, the base station sends a message to the relay instructing the relay to measure and report $C_{SR}$ for a particular subscriber station. The base station may then transmitting a message indicating whether the relay station should relay data from the subscriber station to the base station. For non transparent signaling, in addition to the previous steps, the base station also needs to transmit a handoff message to the subscriber station instructing the subscriber station to connect with the relay station.

The previously described process can also be handled by the relay station. In that case, the relay station transmits a message to the base station instructing the base station to measure and report link quality for a subscriber station to relay station link ($C_{SB}$).

An additional embodiment of the invention comprises a method for determining a link path between a subscriber station and a base station, the method comprising the steps of: determining a link quality ($C_{SR}$) between the subscriber station and a relay station; determining a link quality ($C_{RB}$) between the relay station and the base station; determining a link quality ($C_{SB}$) between the subscriber station and the base station; comparing a function of $C_{SB}$ to a function of at least $C_{SR}$ and $C_{RB}$; and determining whether utilize the relay station in forming the link path between the subscriber station and the base station based at least on the comparison. The last 2 steps of this method may also be replaced with the following three steps: Based on at least the link qualities (Csr, Crb), determine a quality of a first link path between the subscriber station and the base station that passes through the relay station; Based on at least the link qualities (Csb), determine a quality of a second link path between the subscriber station and the base station that does not pass through the relay station; and based on at least the quality of the first and second link paths, determining whether to utilize the first link path or the second link path between the subscriber station and the base station. Determining a quality of a second link path between the subscriber station and the base station that does not pass through the relay station based on at least the link qualities (Csb) may comprise using Csb as the quality of the second link path. Also, Cxy can be related to an anticipated data rate between x and y, or to a previous data rate between x and y. When the relay station is utilized in forming the link path between the subscriber station and the base station, the link path passes through the relay station. Also, the determination of whether utilize the relay station in forming the link path between the subscriber station and the base station may be performed at the base station. When there is more than one relay in a link path, determining a link quality ($C_{RB}$ or others) may include the effect of all of the relays in the path. Also the subscriber station, base station, and relay station may communicate on a shared radio frequency channel. Also, the step of comparing $C_{SB}$ to a function of at least $C_{SR}$ and $C_{RB}$ and/or the step of determining whether utilize the relay station may be performed at the base station. Also, that the base station may provide an indication of the subscriber station ID to the relay station and/or a channel resource upon which the subscriber station will transmit and/or an indication of an expected transmit power level of the subscriber station, to assist in measuring the link quality. Also, the base station may receive a link quality report from the relay station indicating $C_{SR}$. Also, $C_{RB}$ may be based at least in part on a modulation-coding scheme being used for communication between the relay station and the base station. Also, the base station may notify the subscriber station to utilize the relay, such as by providing a cell ID associated with the relay station, which may be done with a MOB_BSHO-REQ or similar message. Also, the base station may notify the relay station of an imminent subscriber connection if the base station knows that such a connection will occur soon. Also, the processing described to occur at the base station could at least in part be carried out by the relay station. In such a case, the relay station may need to obtain at least some of the link quality information from the base station, and the relay station may determine a link path recommendation and send it to the base station. Also, when a direct link path is selected between the base station and subscriber station, the relay station may instruct the subscriber station to connect to the base station, and send a message to notify the base station of an imminent subscriber connection. Also, when an additional relay is available on a parallel link path (e.g., relay 2), a link quality ($C_{SR2}$) may be determined between the subscriber station and the second relay station, between the second relay station and the base station ($C_{RB2}$), and then the determination of whether utilize the relay station in forming the link path between the subscriber station and the base station based at least on the comparison may include comparing the function of at least $C_{SR2}$ and $C_{RB2}$ to the function of at least $C_{SR}$ and $C_{RB}$.

An additional embodiment of the invention comprises a method for determining a link path between a base station and a subscriber station, the method comprising the steps of: determining a link quality ($C_{RS}$) between a relay station and the subscriber station; determining a link quality ($C_{BR}$) between the base station and the relay station; determining a link quality ($C_{BS}$) between the base station and the subscriber station; comparing $C_{BS}$ to a function of at least $C_{RS}$ and $C_{BR}$; and determining whether utilize the relay station in forming the link path between the base station and the subscriber station based at least on the comparison. The last 2 steps of this method may also be replaced with the following three steps: Based on at least the link qualities ($c_{RS}$, Cbr), determine a quality of a first link path between the base station and the subscriber station that passes through the relay station; Based on at least the link qualities (Cbs), determine a quality of a second link path between the base station and the subscriber station that does not pass through the relay station; and based on at least the quality of the first and second link paths, determining whether to utilize the first link path or the second link path between the base station and the subscriber station. Also, when there is more than one relay in a link path, determining a link quality ($C_{BR}$ or others) may include the effect of all of the relays in the path. Also, the subscriber station, base station, and relay station communicate on a shared radio frequency channel (e.g., in a TDD system). One or more of the steps may be performed at the base station or the relay station. Also, the base station may instruct the relay to request the subscriber station to measure and report $C_{BS}$. The relay may request that the subscriber station measure and report based on CINR/RSSI etc., such as by sending a MOB_SCN-RSP message to the subscriber station. Also, the base station may request that that the relay station measure/report one or more of the link qualities, such as $C_{BR}$ or $C_{RS}$. Also, the base station may obtain the link quality $C_{RS}$ from the subscriber station, such as by sending a request to the subscriber station to measure/report link quality (e.g., using a MOB_SCN-RSP message). When the path that includes the relay is selected, the base station may notify the subscriber station to utilize the relay, which may include providing a cell ID associated with the relay station to the subscriber station (e.g., using a MOB_BSHO-REQ message), and may also include the base station notifying the relay station of an imminent subscriber connection. When the selected link path is a direct path between the base station and the subscriber station, the base station may instruct the relay to send a message to the subscriber station to directly connect to the base station (e.g., the relay may send a MOB_BSHO-REQ message to the subscriber station). Also, one or more of the steps of this embodiment may be performed by the relay station. The relay station may request the subscriber station to measure and report $C_{BS}$. (e.g., by sending a MOB_SCN-RSP message to the subscriber station). Also, the base station may obtain the link quality $C_{RS}$ from the subscriber station, and the base station may provide the link quality $C_{BS}$ to the relay station. Also, relay station may instruct the base station to request the subscriber station to measure and report $C_{BS}$ such as by requesting the base station to send a MOB_SCN-RSP message to the subscriber station. Also, the relay station may send a link path recommendation to the base station. Also, when the link path is changing from a path that includes the relay to a path that does not include the relay, the relay station may instruct the subscriber station to utilize the base station (e.g., by sending a MOB_BSHO-REQ message to the subscriber station), and the relay station may optionally notify the base station of an imminent subscriber station connection.

FIG. 10 illustrates communication system 1000 where an exemplary path of more than one relay is included in the path between the base station and the subscriber station. In the example shown if FIG. 10 there are three hops overall between the base station and the subscriber station. All the algorithms previously described can be applied e.g., at the $RS_1$ level, by having $RS_1$ using the signaling previously described for the base station, $RS_2$ using the signaling previously described for the relay station, and SS using the signaling previously described for the subscriber station. FIG. 10 also illustrates that in some embodiments, the link quality between a base station, a first relay station, and a second relay station may be considered as a single composite (end-to-end) link quality between the base station and the second relay station.

FIG. 11 illustrates communication system 1100 where there is more than one potential candidate relay for establishing the path between the base station and the subscriber station. In such a situation, the base station may evaluate the three possible paths: a) direct path between the base station and the subscriber station, b) a path using $RS_1$ as the intermediary relay station, and c) a path using $RS_2$ as the intermediary relay. In doing the path determination, the base station needs to evaluate $C_{RS1}$ and $C_{RS2}$, with the signaling previously defined. Then the base station computed $C_{BS\text{-}RS1}$ and $C_{BS\text{-}RS2}$ and compares these two values with $C_{BS}$ to determine the best path.

FIG. 12 illustrates communication system 1200 having the link quality between a first relay station, second relay station and a subscriber station optionally be considered as a single composite (end-to-end) link quality between the first relay and the subscriber station.

Messages

Next, exemplary embodiments of messages, for some aspects the invention, for an IEEE 802.16 system are given. Although not shown, it is also preferred that the relay station periodically provide some or all of its DCD and UCD information to the base station, in order to allow the base station to convert DIUC and UIUC indices to link capacity or modulation/coding rate values. The simplest way to provide this is for the relay station to occasionally send its DCD and/or UCD messages to the base station, possibly with a new wrapper or header that is specifically designed for the relay station to base station link.

RS_CAP_DL-REQ.

This message can be sent by the BS to the RS to request that the RS measure and report the link quality on the RS to SS link.

| Syntax | Size | Notes |
|---|---|---|
| RS_CAP_DL-REQ_Message_Format( ) { | | |
| Management Message Type=TBD | 8 bits | |
| Report metric | 8 bits | Bitmap indicating metrics on which the corresponding triggers are based:<br>Bit 0: RS to SS CINR mean<br>Bit 1: RS to SS RSSI mean<br>Bit 2: RS to SS DIUC<br>Bit 3: overhead-adjusted DIUC<br>Bit 4: overhead-adjusted MCR<br>Bits 5-7: reserved |
| } | | |

Parameters can be as follows:

CID (in the Generic MAC Header)

RS Primary Management CID.

The following parameters can be as follows for the RS_CAP_DL-REQ message:

Report Metric

Bitmap indicator of trigger metrics that the BS requests the RS to report.

Bit 0: RS to SS CINR mean

Bit 1: RS to SS RSSI mean

Bit 2: RS to SS DIUC. This is the DIUC that the RS most recently used when transmitting to the SS Bit 3: overhead-adjusted DIUC Bit 4: overhead-adjusted MCR Bits 5-7: reserved; can be set to zero.

RS_CAP_DL-RSP.

In response to the RS_CAP_DL-REQ message, the RS can send an RS_CAP_DL-RSP.

| Syntax | Size | Notes |
|---|---|---|
| RS_CAP_DL-RSP_Message_Format( ) { | | |
| Management Message Type=TBD | 8 bits | |
| Report metric | 8 bits | Bitmap indicating metrics on which the corresponding triggers are based:<br>Bit 0: RS to SS CINR mean<br>Bit 1: RS to SS RSSI mean<br>Bit 2: RS to SS DIUC<br>Bit 3: overhead-adjusted DIUC<br>Bit 4: overhead-adjusted MCR<br>Bits 5-7: reserved |
| If (Report metric[Bit 0]==1) RS to SS CINR mean | 8 bits | |
| If (Report metric[Bit 1]==1) RS to SS RSSI mean | 8 bits | |
| If (Report metric[Bit 2]==1) Bit 2: RS to SS DIUC | 8 bits | |
| If (Report metric[Bit 3]==1) Bit 3: overhead-adjusted DIUC | | |
| If (Report metric[Bit 4]==1) Bit 4: overhead-adjusted MCR | | |
| } | | |

The RS_CAP_DL-RSP message can include the following parameters:

CID (in the Generic MAC Header)

RS Primary Management CID.

The following parameters can be as follows for the RS_CAP_DL-RSP message:

Report Metric

Bitmap indicator of trigger metrics that the RS to reports.

RS to SS CINR Mean

Indicates the CINR measured by the RS from the particular SS.

The value can be interpreted as a signed byte with units of 0.5 dB. The measurement can be performed on the subcarriers of the BS-to-RS preamble which are active in the particular BS s segment.

RS to SS RSSI Mean

Indicates the Received Signal Strength measured by the RS from the particular BS.

The value can be interpreted as an unsigned byte with units of 0.25 dB, such that 0x00 is interpreted as −103.75 dBm, an MS can be able to report values in the range −103.75 dBm to −40 dBm. The measurement can be performed on the BS-to-RS preamble.

RS to SS DIUC

Indicates the DIUC that the RS most recently used when transmitting to the SS.

Note that DIUC is equivalent to an MCS index.

Overhead-Adjusted DIUC

A DIUC value that has been compensated for overhead. Also known as "net" DIUC

Overhead-Adjusted MCR

A modulation/coding rate value that has been compensated for overhead. Also known as "net" MCR, it will have a smaller value than the MCR used by the RS to transmit to the SS.

RS_MEAS_SS-REQ.

The BS can send this message to the RS to request it to send a MOB_SCN-RSP message to the SS in order to measure the link quality of the BS-to-SS link.

| Syntax | Size | Notes |
| --- | --- | --- |
| RS_MEAS_SS-REQ_Message_Format( ) { | | |
| Management Message Type=TBD | 8 bits | |
| CID | 16 bits | Primary management CID of the SS |
| Report metric | 8 bits | Bitmap indicating metrics on which the corresponding triggers are based:<br>Bit 0: BS CINR mean<br>Bit 1: BS RSSI mean<br>Bits 2-7: reserved |
| } | | |

The parameters of the RS_MEAS_SS_REQ can be as follows:

CID

Primary management CID of the SS

Report Metric

Bitmap indicator of trigger metrics that the BS requests the SS to report.

Bit 0: BS CINR mean

Bit 1: BS RSSI mean

Bits 2-7: reserved; can be set to zero.

RS_MEAS_SS-RSP.

The RS can send this message to the BS in reply to an RS_MEAS_SS-REQ in order to report the link quality of the BS-to-SS link.

| Syntax | Size | Notes |
| --- | --- | --- |
| RS_MEAS_SS-RSP_Message_Format( ) { | | |
| Management Message Type=TBD | 8 bits | |
| CID | 16 bits | Primary management CID of the SS |
| Report metric | 8 bits | Bitmap indicating metrics on which the corresponding triggers are based:<br>Bit 0: BS CINR mean<br>Bit 1: BS RSSI mean<br>Bits 2-7: reserved |
| If (Report metric[Bit 0]==1) | | |
| BS CINR mean | 8 bits | |
| If (Report metric[Bit 1]==1) | | |
| BS RSSI mean | 8 bits | |
| } | | |

The parameters of the RS_MEAS_SS_RSP can be as follows:

CID (in the Generic MAC Header)

RS Primary Management CID.

Report Metric

Bitmap indicator of trigger metrics that the RS to reports.

BS CINR Mean

The BS CINR mean parameter indicates the CINR measured by the SS from the particular BS.

The value can be interpreted as a signed byte with units of 0.5 dB. The measurement can be performed on the subcarriers of the frame preamble which are active in the particular BS segment BS RSSI Mean The BS RSSI mean parameter indicates the Received Signal Strength measured by the RS from the particular BS. The value can be interpreted as an unsigned byte with units of 0.25 dB, such that 0x00 is interpreted as −103.75 dBm, an MS can be able to report values in the range −103.75 dBm to −40 dBm. The measurement can be performed on the frame preamble.

RS_INITIATEHO-REQ.

When the BS determines that an SS connected to one of its downstream RS should establish a direct path with the BS, the BS can instruct the RS to send an RS_INITIATEHO-REQ:

| Syntax | Size | Notes |
| --- | --- | --- |
| RS_INITIATEHO-REQ_Message_Format( ) { | | |
| Management Message Type=TBD | 8 bits | |
| CID | 16 bits | Primary management CID of the SS |
| } | | |

RS_INITIATEHO-RSP.

When the BS determines that an SS connected to one of its downstream RS should establish a direct path with the BS, the BS can instruct the RS to send an RS_INITIATEHO-REQ:

An RS can optionally acknowledge an RS_INITIATEHO-REQ with the RS_INITIATEHO-RSP message:

| Syntax | Size | Notes |
| --- | --- | --- |
| RS_INITIATEHO-RSP_Message_Format( ) { | | |
| Management Message Type=TBD | 8 bits | |
| CID | 16 bits | Primary management CID of the SS |
| } | | |

RS_IMMINENTHO.

The BS may optionally send this message to notify the RS of the imminent handoff of an SS to the RS.

| Syntax | Size | Notes |
|---|---|---|
| RS_IMMINENTHO_Message_Format( ) { | | |
| Management Message Type=TBD | 8 bits | |
| MAC ID | 48 bits | MAC ID of the SS that will handoff to the RS |
| } | | |

RS_CAP_UL-REQ.

This message can be sent by the BS to the RS in order to request measurement of the quality of the SS to-RS link.

| Syntax | Size | Notes |
|---|---|---|
| RS_CAP_UL-REQ_Message_Format( ) { | | |
| Management Message Type=TBD | 8 bits | |
| CID | 16 bits | SS primary management CID |
| Report metric | 8 bits | Bitmap indicating metrics on which the corresponding triggers are based: Bit 0: SS CINR mean Bit 1: SS RSSI mean Bit 2: SS UIUC Bit 3: SS transmit power Bit 4: Overhead-adjusted UIUC Bit 5: Overhead-adjusted MCR Bits 6-7: reserved |
| } | | |

The parameters can be set as follows in the RS_CAP_UL-REQ message:

CID (in the Generic MAC Header)

RS Primary Management CID.

Report Metric

Bitmap indicator of trigger metrics that the BS requests the RS to report.

Bit 0: SS CINR mean

Bit 1: SS RSSI mean

Bit 2: SS UIUC. Note that UIUC is equivalent to an MCS index.

Bit 3: SS transmit power

Bit 4: Overhead-adjusted UIUC

Bit 5: Overhead-adjusted MCR

| Syntax | Size | Notes |
|---|---|---|
| RS_CAP_UL-RSP_Message_Format( ) { | | |
| Management Message Type=TBD | 8 bits | |
| Report metric | 8 bits | Bitmap indicating metrics on which the corresponding triggers are based: Bit 0: BS CINR mean |

-continued

| Syntax | Size | Notes |
|---|---|---|
| | | Bit 1: BS RSSI mean Bit 3: SS transmit power Bit 4: Overhead-adjusted UIUC Bit 5: Overhead-adjusted MCR Bits 6-7: reserved |
| If (Report metric[Bit 0]==1) SS CINR mean | 8 bits | |
| If (Report metric[Bit 1]==1) SS RSSI mean | 8 bits | |
| If (Report metric[Bit 2]==1) Bit 2: SS UIUC | 8 bits | |
| If (Report metric[Bit 3]==1) Bit 3: SS Transmit power | | |
| If (Report metric[Bit 4]==1) Bit 4: Overhead-adjusted UIUC | | |
| If (Report metric[Bit 5]==1) Bit 5: Overhead-adjusted MCR | | |
| } | | |

Bits 6-7: reserved; can be set to zero.

RS_CAP_UL-RSP.

In response to the RS_CAP_UL-REQ message, the RS can send an RS_CAP_UL-RSP:

The parameters can be set as follows in the RS_CAP_UL-RSP message:

CID (in the Generic MAC Header)

RS Primary Management CID.

Report Metric

Bitmap indicator of trigger metrics that the RS reports to the BS.

Bit 0: BS CINR mean

Bit 1: BS RSSI mean

Bit 3: SS transmit power

Bit 4: Overhead-adjusted UIUC

Bit 5: Overhead-adjusted MCR

Bits 6-7: reserved; can be set to zero.

SS CINR Mean

The SS CINR mean parameter indicates the CINR measured by the RS from the particular SS.

The value can be interpreted as a signed byte with units of 0.5 dB. The measurement can be performed on the subcarriers that are assigned to the UL burst of the SS of interest.

BS RSSI Mean

The BS RSSI mean parameter indicates the Received Signal Strength measured by the RS from the particular SS of interest. The value can be interpreted as an unsigned byte with units of 0.25 dB, such that 0x00 is interpreted as −103.75 dBm, and RS can be able to report values in the range −103.75 dBm to −4° dBm. The measurement can be performed on the subcarriers that are assigned to the UL burst of the SS of interest.

SS UIUC

Indicates the UIUC that the RS most recently assigned to the SS.

Note that UIUC is equivalent to an MCS index.

SS Transmit Power

Indicates the transmit power that the SS is using.

Overhead-Adjusted UIUC

A UIUC value that has been compensated for overhead. Also known as "net" UIUC

Overhead-Adjusted MCR

A modulation/coding rate value that has been compensated for overhead. Also known as "net" MCR, it will have a smaller value than the MCR used by the SS to transmit to the RS.

RS-UL_MAP_RX-REP

To enable UL link metric estimation procedures for an SS, the RS and the BS can exchange this message to indicate the particular UL burst allocation made to the SS:

| Syntax | Size | Notes |
| --- | --- | --- |
| RS-UL_MAP_RX-REP_Message_Format( ) { | | |
| Management Message Type=TBD | 8 bits | |
| CID | 16 bits | Primary management CID of the SS |
| UIUC | 4 bits | |
| OFDMA symbol offset | 7 bits | |
| Length | 4 bits | Length of the SS uplink zone |
| Permutation | 2 bits | |
| PUSC UL_IDcell | 7 bits | |
| First slot in zone | 10 bits | First slot of the allocation for the SS |
| Length | 10 bits | Length of the allocation for the SS |

VARIATIONS

While the invention has been particularly shown and described with reference to a particular embodiment, it will be understood by those skilled in the art that various changes in form and details may be made therein without departing from the spirit and scope of the invention. For example, the capacity calculation based on the MCR of the data transmission does not include control channel overhead. If the control channel overhead is small, or is similar for both the relay and the base station, then the impact on the routing decision will be nearly insignificant. However, if desired, the subscriber station can include a control channel overhead assumption in the capacity calculations. The control channel overhead assumption could be predetermined and fixed based on the system design, or it could be determined dynamically. The dynamic determination could be made based on monitoring the control channels of the base station and relay station, or the relay station/base station could broadcast overhead factors for the subscriber station to use.

Additionally, the link path decision may take multiple factors into account, such as the traffic loading of the base station and/or relay station, traffic que levels, anticipated future changes in link quality, and so forth.

Additionally, alternate methods based on the same principle could utilize a capacity indicator, efficiency indicator, etc. for the base station to relay station and relay station to base station links rather than MCS.

Additionally, in some cases, it may happen that a relay cannot allocate all of its resources for relaying. In this case, the relay may include the fraction of resources that can be allocated for relaying in the signaling messages. Or, more efficiently, the fraction of resources can be embedded in the link quality (e.g., MCS, capacity) computation: for instance, if the relay can allocate 50% of its resources for relaying, its link efficiency could be normalized to $MCS_{RS}2$ instead of $MCS_{RS}$. Similarly, on the uplink, when computing the SINR for the subscriber station to relay station or subscriber station to base station link, the subscriber station can take into account the number of subcarriers assigned for this particular transmission.

Additionally, while the above description was presented for a two-hop architecture, the extension for a higher number of hops is straightforward. More signaling is necessary, because the capacity of all the intermediate links is needed.

The routing decision is then preferably made based on the end-to-end capacity computation.

Additionally, when determining a best route, other relay stations may be considered for routing. For example, the base station may consider a second relay station RS2 when considering the best link path. In such systems, the best link would be additionally determined by determining a link quality ($C_{SR2}$) from the subscriber station to a second relay station and determining a link quality ($C_{RB2}$) from the second relay station to the base station. The step of determining whether utilize the relay station in forming the link path from the subscriber station to the base station will be additionally based on comparing at least $C_{SR2}$ and $C_{RB2}$ to $C_{SR}$ and $C_{RB}$.

It is intended that such changes and variations come within the scope of the following claims.

The invention claimed is:

1. A base station comprising:
a transmitter requesting channel quality information from a subscriber and a relay;
a receiver receiving an over-the-air transmission that contains channel quality information; and
logic circuitry determining a link quality ($C_{SR}$) from the subscriber station to a relay station, determining a link quality ($C_{RB}$) from the relay station to the base station, determining a link quality ($C_{SB}$) from the subscriber station to the base station, determining a quality of a first link path from the subscriber station to the base station that passes through the relay station based on the link qualities ($C_{SR}$, $C_{RB}$), determining a quality of a second link path from the subscriber station to the base station that does not pass through the relay station based on the link quality ($C_{SB}$), and determining whether to utilize the first link path or the second link path from the subscriber station to the base station based on at least the quality of the first and second link paths; and
wherein the base station will use the determined first or second link path for uplink or downlink transmissions.

2. The base station of claim 1 wherein the over-the-air transmission comprises an IEEE 802.16 MOB_SCN-REP message containing quality information.

3. The base station of claim 1 wherein request for link quality measurements comprises an IEEE 802.16 MOB_SCN-RSP message.

4. The base station of claim 3 wherein the over-the-air transmission comprises an IEEE 802.16 MOB_SCN-REP message containing quality information.

* * * * *